United States Patent
Costa

[11] 3,957,205
[45] May 18, 1976

[54] SPRINKLER

[76] Inventor: Robert B. Costa, 5102 N. Greer Ave., Covina, Calif. 91722

[22] Filed: Feb. 20, 1975

[21] Appl. No.: 551,243

[52] U.S. Cl. ............................ 239/230; 239/264; 285/281
[51] Int. Cl.² ...................... B05B 3/14; F16L 27/00
[58] Field of Search ..................... 285/278–281; 239/206, 210, 225, 230, 237, 251, 264

[56] References Cited
UNITED STATES PATENTS

| | | | |
|---|---|---|---|
| 1,921,136 | 8/1933 | Santiago | 285/281 X |
| 2,712,457 | 7/1955 | Kimbro | 285/278 |
| 2,733,080 | 1/1956 | Jill | 285/281 X |
| 2,907,590 | 10/1959 | Oswald | 285/281 X |
| 2,928,608 | 3/1960 | Royer | 239/230 |
| 2,946,517 | 7/1960 | Jacoby | 239/264 |
| 3,580,506 | 5/1971 | Costa | 239/230 |
| 3,580,508 | 5/1971 | Marandi | 239/230 |
| 3,743,183 | 7/1973 | Malcolm | 239/264 |
| 3,744,721 | 7/1973 | Baumstark | 285/281 X |
| 3,764,073 | 10/1973 | Costa et al. | 239/230 |
| 3,799,631 | 3/1974 | Martina | 239/230 |

Primary Examiner—Robert S. Ward, Jr.
Attorney, Agent, or Firm—Boniard I. Brown

[57] ABSTRACT

A sprinkler having a sprinkler head fixed to a tubular spindle which is rotatably journaled in and spring biased upwardly relative to a bearing sleeve, and improved upper and lower seals for sealing the clearance space between the spindle and bearing sleeve against entrance of water, dirt, grit and the like. The upper seal includes a seal ring which is yieldably retained by the spring in sealing force on the sprinkler head and has a depending annular flexible sealing lip surrounding and engaging a circumferential sealing surface on the bearing sleeve in such a way that if the spindle is pressed downwardly through the bearing sleeve against spring action, the seal ring wipes or scrapes dirt and grit from the sealing surface to prevent jamming of the seal ring on the bearing sleeve during upward spring return of the spindle. The lower seal, which serves also as a spindle thrust bearing, is particularly useful on a water actuated impulse sprinkler and includes a carbon-graphite seal ring cushioned between resilient seal rings for providing the friction necessary for proper operation of the water actuated impulse driving means of the sprinkler.

18 Claims, 9 Drawing Figures

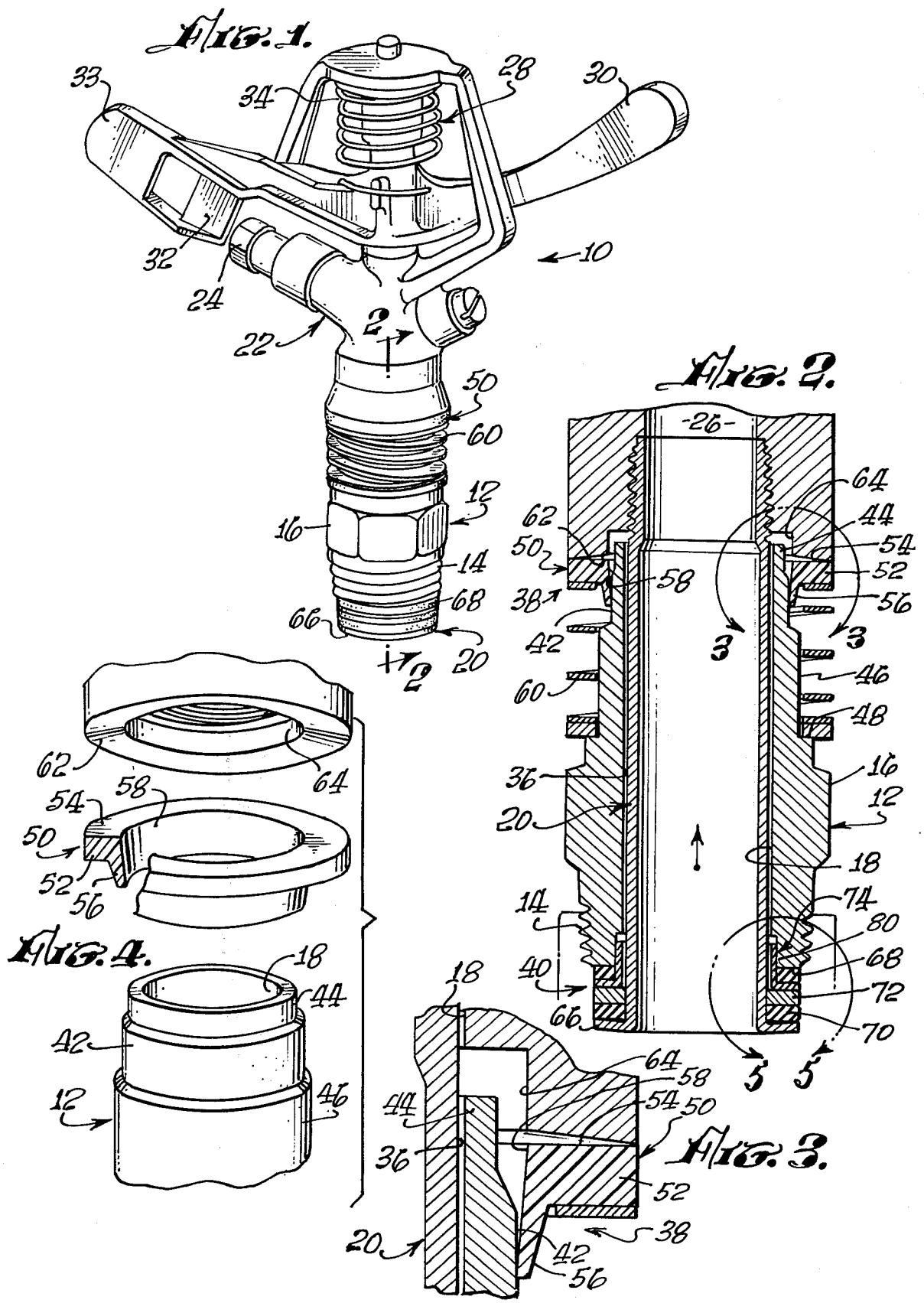

U.S. Patent May 18, 1976 Sheet 2 of 2 3,957,205
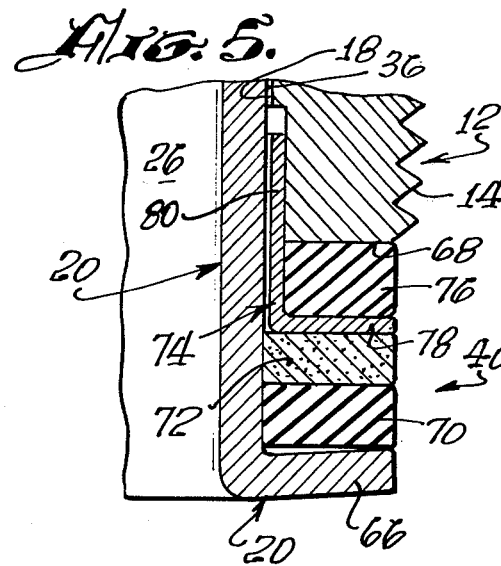
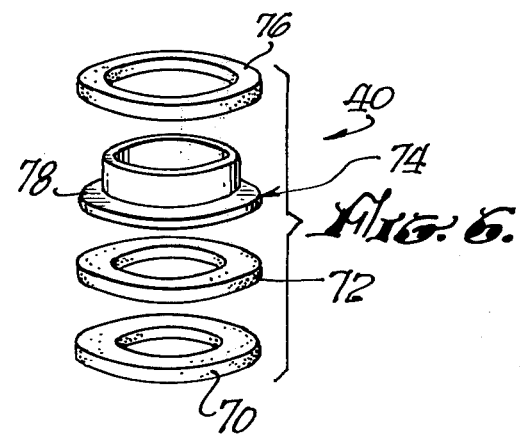
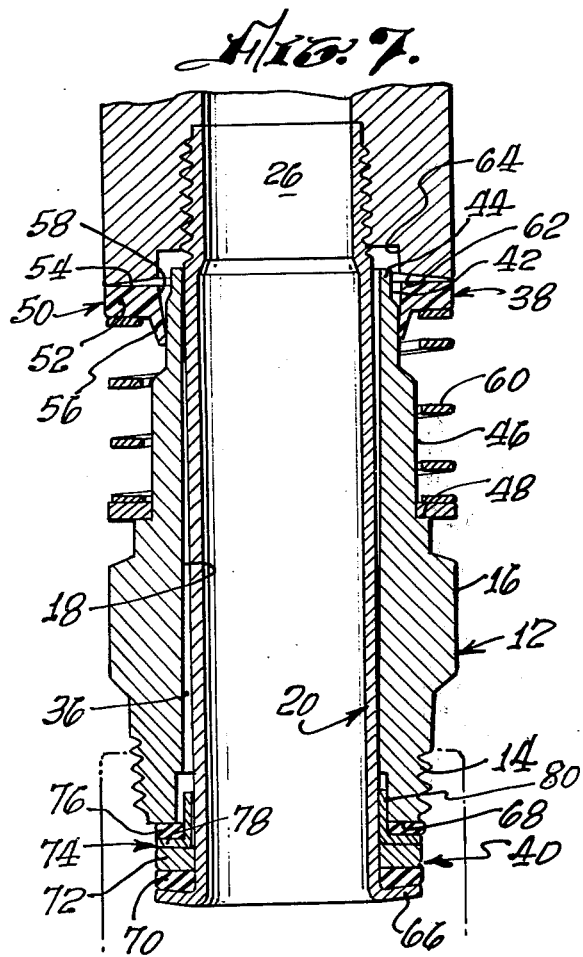

SPRINKLER

BACKGROUND OF THE INVENTION

1. Field of the Invention

This invention relates generally to sprinklers, such as water actuated impulse sprinklers, one of the type having a sprinkler head fixed to a tubular spindle which is rotatably journaled in a bearing sleeve. More particularly, the invention relates to novel improved upper and lower seals for such sprinklers for sealing the clearance space between the spindle and bearing sleeve against entrance of water, dirt, grit and the like.

2. Prior Art

Large areas are commonly watered with water actuated impulse sprinklers of the kind having a spring biased impulse oscillator rotatably mounted on the sprinkler head for oscillation of a deflection vane on the oscillator into and from the water stream or jet emerging from a discharge orifice in the head. Each time the oscillator vane swings by spring action into the path of the water jet, the latter strikes the vane and imparts a torgue to the vane for rotating the oscillator into the stream. The stream is then diverted by the scoop, thus imparting torque to the oscillator in the opposite direction. This back and forth oscillatory motion of the oscillator imparts periodic impulses to the sprinkler head for driving the head in rotation with an intermittent rotary motion.

Sprinklers of this type have a bearing sleeve which is threaded at its lower end for connection to a water supply riser or the like. A bearing bore extends axially through the bearing sleeve. Journaled in the bearing bore is a tubular spindle. The sprinkler head is fixed to the upper end of this spindle. As described above, this sprinkler head carries an impulse oscillator actuated by the water jet issuing from the sprinkler head orifice for driving the head and spindle in intermittent rotation.

This type of sprinkler presents two major operating problems to which the present invention is addressed. One of these problems stems from the fact that the outer spindle diameter is made slightly smaller than the diameter of the bearing sleeve bore to permit free rotation of the sprinkler head and spindle. Accordingly, these exists between the spindle and bearing sleeve a small annular clearance space. Water leakage through this space is prevented by a combination seal and thrust bearing on the lower end of the spindle and engaging an annular sealing and thrust face on the lower end of the sleeve about the spindle. Some sprinklers of the character described, such as simple residential lawn sprinklers, however, have no provision for sealing the upper end of the clearance space. While these simple sprinklers are satisfactory for home use, they are ill suited to field irrigation use and other similar large scale commercial uses for the reason that dirt and grit often enter the clearance space through its open upper end and cause marring of the spindle and bearing sleeve bearing surfaces, jamming of the spindle in the bearing sleeve, and other undesirable consequences.

For this reason, impulse sprinklers for such commercial uses are commonly equipped with upper seals as well as lower seals for sealing both the upper and lower ends of the clearance space between the spindle and bearing sleeve against entrance of water, dirt, grit and the like. U.S. Pat. No. 2,980,341, for example, discloses a dual impulse sprinkler with both upper and lower seals.

While the existing dual seal sprinklers alleviate the problem of dirt and grit entrance into the bearing clearance space, they present another problem. Thus, one type of upper seal for such sprinklers and that shown in the above patent comprises a seal ring which surrounds and engages a circumferential bearing surface on the upper end of the bearing sleeve and is urged axially by a spring into sealing contact with an annular sealing face on the sprinkler head. The spring also urges the spindle upwardly relative to the bearing sleeve to retain the sealing surfaces of the lower seal and thrust bearing in contact, thus to prevent entrance of dirt and grit between these surfaces and into the bearing clearance space as long as the spindle is not pressed down into the bearing sleeve by compressing the spring, the upper seal may continue to function properly. Even then, however, some dirt and grit may enter between the bearing sleeve and the seal ring, which is relatively unyieldable, and cause jamming of the ring or wearing of its sealing surface and that of the bearing sleeve.

On the other hand, if the spring is compressed, as often happens, the seal ring is forced to slide downwardly along the bearing sleeve. When this occurs, corrosion, dirt and grit on the sleeve often enters between the sleeve and ring, causing the ring to jam on the sleeve with the result that ring does not return to its proper position of sealing engagement with the sprinkler head sealing face when the downward force on the head and spindle is removed.

In another type of known upper seal for a dual seal impulse sprinkler, the upper seal ring engages the spindle and is spring biased downwardly into sealing contact with an upper sealing face on the bearing sleeve. The seal ring is grooved in its upper face to form an annular sealing lip which bears against the spindle. This lip is intended to wipe or scrape the spindle in the event the latter is pressed downwardly through the seal ring and bearing sleeve by compression of the upper seal spring, thus to prevent the ring from jamming on the spindle. However, the upper groove in the seal ring is exposed to being filled with dirt and grit which inhibits or prevents flexing of the seal ring lip and thus renders the ring prone to jamming in the spindle when the latter is released to return upwardly by spring pressure.

Another major problem encountered in the existing impulse sprinklers involves the lower seal and thrust bearing, as is well known to those versed in the art of these sprinklers, this lower seal and thrust bearing must provide a somewhat critical frictional resistance to rotation of the spindle relative to the bearing sleeve. If the lower seal friction is too small, the spindle will slip or rotate in the bearing sleeve when the impulse oscillator is swung by the water jet impact from the jet path to tension the oscillator torsion spring, thus causing improper operation of or totally incapacitating the impulse driving means. On the other hand, if the lower seal friction is too large, the impacts generated by the impulse oscillator are incapable of driving the sprinkler head in rotation.

SUMMARY OF THE INVENTION

This invention provides improved upper and lower seals for sprinklers of the character described which avoid or alleviate the problems discussed above. The upper seal comprises a seal ring constructed of a relatively hard though flexible material, such as Teflon, Nylon, hard rubber or the like. This ring surrounds and engages a circumferential sealing surface on the upper end of the bearing sleeve and is urged upwardly into sealing contact with an annular sealing surface on the lower end of the sprinkler head by a spring which also biases the spindle upwardly in the bearing sleeve. Depending from the under side of the seal ring is an annular flexible sealing and wiping lip which engages the bearing sleeve sealing surface. In the event that the spring is compressed to press the spindle downwardly in the bearing sleeve, this lip wipes or scrapes dirt, grit and the like from the sealing surface as the seal ring moves downwardly along the bearing sleeve with the spindle in a manner which prevents jamming or binding of the ring on the bearing sleeve when the spindle is released to return upwardly by spring pressure.

A feature of the upper seal resides in the fact that the central opening through the seal ring is tapered so that only the flexible lower end of the seal ring lip engages the bearing sleeve sealing surface, thus further insuring against jamming of the ring on the sleeve. Another important feature of the upper seal is that its tapered lip configuration produces less friction when the upper seal is returned to its normal position, following spring compression, in a pulling sliding action rather than a pushing sliding action, thus facilitating return of the seal to its normal position. According to another feature of the seal, the confronting sealing faces of the upper seal ring and sprinkler head abut along an annular region of contact radially spaced from the inner edge of the ring and are spaced inward of this contact region. The seal spring exerts an axial pressure on the seal ring inwardly of the annular contact ring in such a way that the inner portion of the ring is gradually deformed upwardly over a period of time to maintain the seal ring lip in sealing contact with the bearing sleeve.

The lower seal comprises a carbon-graphite ring which provides just the right frictional resistance to spindle rotation to assure proper operation of the sprinkler impulse driving means. This carbon-graphite ring is between a resilient seal ring and a wear-resistant ferrule, and is thus protected against fracture. The ferrule, which constitutes a feature of the invention, has a radially extending flange portion and an axial sleeve portion which abuts a resilient seal ring, thus preventing seal ring deformation against the rotating spindle which would hamper rotation, while providing the improved sealing of a resilient seal ring.

BRIEF DESCRIPTION OF THE DRAWINGS

FIG. 1 is a perspective view of an impulse sprinkler embodying improved upper and lower seals according to the invention;

FIG. 2 is an enlarged section taken on line 2—2 in FIG. 1;

FIG. 3 is a further enlargement of the area encircled by the arrow 3—3 in FIG. 2;

FIG. 4 is an exploded perspective view of the upper seal;

FIG. 5 is an enlargement of the area encircled by the arrow 5—5 in FIG. 2;

FIG. 6 is an exploded perspective view of the lower seal;

FIG. 7 is a section similar to FIG. 2 illustrating the manner in which the sprinkler spindle is tilted in the spindle sleeve bearing by the reaction force of the water jet during sprinkler operation;

FIG. 8 is an enlarged section, similar to that of FIG. 5, showing a modified form of lower bearing seal; and FIG. 9 is an exploded perspective view of the lower seal arrangement of FIG. 8.

DESCRIPTION OF THE PREFERRED EMBODIMENT

Referring first to FIGS. 1 and 2 of the drawings, there is illustrated an impulse sprinkler 10 having a bearing sleeve 12 with a lower threaded end 14 for connection to a water supply riser or the like. The sleeve has a polygonal section 16 to receive a wrench for rotating the sleeve. Extending axially through the bearing sleeve is a bearing bore 18 rotatably receiving a tubular spindle 20. Threaded on the upper end of the spindle is a sprinkler head 22 having a discharge orifice 24 which communicates with the water passage 26 through the spindle.

Sprinkler head 22 mounts water actuated impulse driving means 28 for driving the sprinkler head and spindle 20 in one direction of rotation with an intermittent rotary motion. This impulse driving means is well known and hence need not be described in elaborate detail. Suffice it to say that the driving means comprises an impulse oscillator 30 which is rotatably mounted on the head to swing to and from the position of FIG. 1 wherein a water deflection vane 32 and a scoop 33 on the oscillator are located in the path of the water jet from the orifice 24. The oscillator is biased to this position by a torsion spring 34. The water jet from the orifice strikes the vane 32 and imparts torque to the oscillator. The water jet is deflected by the vane onto scoop 33 and is deflected in the opposite direction, thereby impelling the oscillator to swing from its illustrated position, thereby tensioning the spring 34. The spring then returns the oscillator to its position of FIG. 1. This oscillatory motion of the oscillator produces periodic impulses which drive the sprinkler head in rotation with an intermittent rotary motion.

In order to assure free rotation of the spindle in the bearing sleeve bore 18, the outer spindle diameter is made slightly smaller than the bore diameter, thus forming a narrow annular clearance space 36 between the spindle and bearing sleeve 12. This invention provides improved upper and lower seals 38, 40 for sealing the upper and lower ends of this clearance space, against the entrance of water, dirt, grit and the like which would damage the sleeve and spindle bearing surfaces and possibly cause the spindle to bind in the bearing sleeve. Water leakage through the clearance space, of course, must also be prevented.

The upper seal 38 comprises a circumferential, coaxial cylindrical sealing surface 42 on the upper end of the bearing sleeve 12. The sleeve is stepped above and below this bearing surface to provide a reduced upper end portion 44, above the surface and, below the surface, an enlarged cylindrical portion 46 terminating at its lower end in an upwardly facing shoulder 48. Surrounding the sleeve bearing surface 44 is a seal ring 50 of relatively hard though flexible material, such as Teflon, Nylon, hard rubber or the like. This seal ring has an annular body 52 of generally rectangular crosssection with an upper annular sealing face 54 and an annular flexible skirt-like sealing lip 56 depending from the under side of the ring body 52 about its inner edge. The central opening through the seal ring is conically tapered, such that the inner surface 58 of the ring flares outwardly from the lower end to the upper end of the opening.

The small diameter end of the seal ring opening at the lower end of the seal ring end 56 is sized to fit snugly but slidably over the sealing surface 42 of the bearing sleeve 12. Accordingly, the lip engages the sealing surface 42 along an annular region of contact at the lower end of the lip, and the inner ring surface 58, above this contact region, recedes and is radially spaced from the sealing surface, as shown best in FIG. 2.

Surrounding the upper end of the bearing sleeve 12 between its shoulder 48 and the seal ring 50 is a compression spring 60. The ends of the spring seat against the shoulder and seal ring. The spring is compressed to urge the seal ring upwardly to its normal sealing position of FIG. 2, wherein the upper sealing face 54 of the ring abuts an annular coaxial sealing face 62 on the lower end of the sprinkler head 22. For reasons which will be explained presently, the ring and head sealing faces 54, 62 abut along an annular region of contact at the outer edge of the ring body 52 and are axially spaced inwardly of this contact region, as shown in FIG. 3. This is accomplished by making one of the sealing faces, in this instance the sprinkler head sealing face, concave. The spring 60 exerts an upward pressure on the seal ring 50 radially inward of its annular contact region with the sprinkler head sealing face 62 and thus tends to deform the inner portion of the ring upwardly toward the latter face.

Entering the lower end of the sprinkler head 22 is a coaxial annular recess 64. The upper reduced end 44 of the bearing sleeve 12 enters this recess.

The lower seal 40 serves both as a seal and a thrust bearing for the spindle 20. This seal-bearing comprises an outwardly directed annular flange shoulder 66 on the lower end of the spindle providing an upper annular sealing and thrust face spaced from and facing an annular sealing and thrust face 68 on the lower end of the bearing sleeve 12. Surrounding the spindle 20 between the flange 66 and the face 68 are four combination seal and thrust bearing rings 70, 72, 74, 76. The lower and upper rings 70, 76 are relatively soft and yieldable rings, such as soft rubber rings. The lower ring 70 fits on the spindle and seats against the flange 66. The upper ring 76 seats against the bearing sleeve face 68. Ring 72 is a carbon-graphite ring which fits slidably on the spindle and seats against the soft ring 70. Finally, ring 74 is a ferrule-like metal ring having a flange 78 disposed between and in contact with the carbon-graphite ring 72 and the upper soft ring 76 and a sleeve 80 which extends through the latter ring. The upper protruding end of the ferrule ring sleeve 80 fits slidably within a recess 82 in the lower end of the bearing sleeve 12, a sufficient distance that it remains in the recess at all times irrespective of axial movement. From this description, it will be understood that the carbon-graphite ring 72, which is relatively brittle, is sandwiched between the two soft rings 70, 76 to shield the ring 72 against fracture and other damage. The upper seal spring 60 urges the spindle 20 upwardly in the bearing sleeve 12, thereby yieldably retaining the lower seal rings 70, 72, 74, 76 in contact, as shown.

In operation of the sprinkler 10, the bearing sleeve 12 is connected to a water supply riser. Water supplied to the sprinkler through the riser emerges through the orifice 24 as a jet which impinges the impulse oscillator vane 32 and scoop 33 to drive the sprinkler head 22 and spindle in rotation. The lower seal and thrust bearing 40 resists the upward thrust of the inlet water pressure and the upper seal spring 34 on the spindle 20 and provides a rotary water tight seal between the spindle and the bearing sleeve 12 to prevent the entrance of water, dirt, grit and the like into the lower end of the clearance space 36 between the spindle and bearing sleeve.

The carbon-graphite ring 72 and the ferrule 74 constitute the major improvements of the present invention to the lower seal 40. This carbon-graphite ring serves two important functions. First, it performs an effective sealing function since it "wears in" during the first few revolutions of the spindle 20 by rubbing off of its carbon-graphite material on the ferrule flange 78 to provide an effective seal ring between the lower seal ring and ferrule flange. Secondly, the carbon-graphite ring provides a desired degree of frictional resistance to rotation of the spindle 20 to prevent retro-rotation of the spindle during the reverse, spring tensioning strokes or swings of the impulse oscillator 30, thus assuring proper driving of the sprinkler head 22 in its intermittent rotary motion by the oscillator. As noted earlier, the carbon-graphite ring, which is relatively brittle, is shielded against fracture and other damage by being cushioned between the soft seal rings 70, 76. In this regard attention is directed to FIG. 7 which indicates the manner in which the spindle 20 is tilted in the bearing sleeve 12 by the reaction of the water jet and the manner in which the soft seal rings yield to accommodate this tilt, cushion the carbon-graphite ring, and maintain a water tight seal.

The ferrule 74, which comprises a feature of the invention, is fabricated of a wear-resistant material, such as an appropriate metal or plastic. As described, soft seal ring 76 is disposed in contact with the flange and sleeve portions of the ferrule. The ferrule sleeve portion thus prevents deformation of this seal ring against the rotating spindle, and prevents spindle rotation-hampering pressure of the seal against the spindle which otherwise would occur. The ferrule thus permits the utilization of a relatively soft seal ring, thus effecting better sealing, while eliminating the rotation-hampering problem which would otherwise exist.

FIGS. 8 and 9 show a modified form of lower seal arrangement wherein a soft rubber seal 76' has an axial or tubular portion 77 disposed about sleeve portion 80 of ferrule 74 which provides additional sealing.

From the earlier description of the upper seal 38, it is evident that this seal provides a tight sealing action between the bearing sleeve 12 and the sprinkler head 22 to seal the upper end of the clearance space 36 by virtue of the abutting sealing faces 54, 62 on the upper seal ring 50 and the sprinkler head. These faces are yieldably retained in sealing contact by the seal spring 60 and engagement of the seal ring lip 56 with the bearing sleeve sealing surface 42. In connection with this seal, it is significant to note that the lip 56 is yieldable to accommodate tilting of the spindle 20, as shown in FIG. 7, and yet maintain effective sealing contact with the bearing sleeve. Moreover, as noted earlier, the seal spring 60 exerts an upward pressure on the body 52 of the upper seal ring radially inward of its outer annular region of contact with the sprinkler head sealing face 62. This upward pressure tends to deform, in lever-like fashion about the outer contact region as a fulcrum, the radially inner portion of the ring upwardly toward the sprinkler head sealing face and thereby constrict the lower end of its sealing lip 56 about and thus maintain the lip in effective sealing contact with the bearing sleeve surface 42. In this regard, it is significant to recall that the opening through the ring is tapered such that the ring engages the sealing surface 42 only at the lower end of the lip.

In the event that the spindle 20 and sprinkler head 22 are pressed downwardly against the upward pressure of the seal spring 60 and relative to the bearing sleeve 12, the seal ring lip 56 slides downwardly along the bearing sleeve sealing surface 42 and wipes or scrapes dirt, grit and the like from the surface. The sealing surface above the lip is thereby wiped clean with the result that the seal ring 50 will not bend or jam on the bearing sleeve and the upper seal 38 will return to its normal sealing condition shown when the sprinkler head is released to return upwardly to its normal position by the thrust of the seal spring 60. In returning to its normal position, the seal is pulled, rather than pushed, in a sliding movement over any dirt, corrosion, etc. on the surface of bearing sleeve surface 42. This feature of the invention is aided by the fact that the inner surface of the seal ring body 52 is spaced from the sealing surface 42 because of the taper of the ring opening. The clearance space between the inner ring surface and the bearing sleeve surface prevents any dirt and grit which may enter between the body and the sleeve from causing the ring body, which is relatively unyieldable compared to its sealing lip, to bend or jam on the bearing sleeve 12, the seal ring lip 56 will effectively ride or slide over any dirt or corrosion on the bearing sleeve sealing surface 42 because of the resiliency of the lip and the taper of its inner surface.

As noted earlier, the upper reduced end 44 of the bearing sleeve 12 projects upwardly into the lower sprinkler head recess 64, as in some existing sprinklers. This provides a laberyinth-like passage to the clearance space 36 which further inhibits entrance of dirt and grit into the space.

It will now be understood that this invention provides improved upper and lower seals for sprinklers of the character described. While these improved seals are particularly adapted for use together on such sprinklers, it is apparent that the improved upper seal may be used with any lower seal and, conversely, the improved lower seal may be used with any upper seal or, for that matter, on sprinklers which have no upper seal.

The inventor claims:

1. In a sprinkler assembly including a bearing sleeve having normally upper and lower ends, a tubular spindle containing a longitudinal water passage rotatable in said bearing sleeve and forming with said sleeve an intervening annular clearance space, lower coacting sealing and thrust bearing means on the lower ends of said bearing sleeve and spindle for sealing the lower end of said clearance space and limiting upward endwise displacement of said spindle relative to said bearing sleeve, a sprinkler head on the upper end of said spindle having a water discharge orifice communicating with said spindle passage, and means for driving said sprinkler head and spindle in rotation relative to said bearing sleeve, improved upper sealing means for sealing the upper end of said clearance space, comprising:

a coaxial cyindrical sealing surface on the upper end of said bearing sleeve,
   a coaxial, downwardly facing annular sealing face on the lower end of said sprinkler head,
   a seal ring surrounding said sealing surface including an annular body having an upper annular sealing face facing said sprinkler head sealing face and a relatively thin-walled annular flexible sealing and wiping lip about the inner perimeter of and depending downwardly from said body in surrounding relation to said sealing surface, the lower end of said lip being disposed in yieldable wiping and sealing contact with said sealing surface and said seal ring being spaced from said sealing surface at all points except said lower lip end, and
   a compression spring surrounding said bearing sleeve and lip and seating downwardly against a shoulder on said bearing sleeve and upwardly against said seal ring body for yieldably retaining said sealing faces in seating contact.

2. In a sprinkler assembly including a bearing sleeve having normally upper and lower ends, a tubular spindle containing a longitudinal water passage rotatable in said bearing sleeve and forming with said sleeve an intervening annular clearance space, lower coacting sealing and thrust bearing means on the lower ends of said bearing sleeve and spindle for sealing the lower end of said clearance space and limiting upward endwise displacement of said spindle relative to said bearing sleeve, a sprinkler head on the upper end of said spindle having a water discharge orifice communicating with said spindle passage, and means for driving said sprinkler head and spindle in rotation relative to said bearing sleeve, improved upper sealing means for sealing the upper end of said clearance space, comprising:

a coaxial cylindrical sealing surface on the upper end of said bearing sleeve,
   a seal ring surrounding said sealing surface including an annular body having an upper annular sealing face facing said sprinkler head sealing face and an annular flexible sealing and wiping lip about the inner perimeter of and depending downwardly from said body in surrounding yieldable wiping and sealing contact with said sealing surface,
   a compression spring surrounding the said bearing sleeve and seating downwardly against a shoulder on said bearing sleeve and upwardly against said seal ring body for yieldably retaining said sealing faces in seating contact,
   one of said sealing faces being concave, whereby said faces abut along a coaxial annular region of contact and are spaced radially inward of said region, and
   said spring exerting axial pressure on said seal ring body radially inward of said contact region, whereby said axial spring pressure causes the portion of said ring body radially inward of said contact region to yield axially toward said sprinkler head sealing face over a period of time to maintain said seal ring lip in sealing and wiping contact with said sealing surface.

3. The improvements of claim 2 wherein:
   said sprinkler head sealing face is the concave sealing face.

4. The improvements of claim 2 wherein:
   said seal ring has a central opening through said ring body and lip receiving said spindle and bounded by an inner annular surface of the ring, and
   said inner ring surface is tapered such that said lip engages said sealing surface along a region of contact at the lower end of the lip and said inner ring surface is spaced from said sealing surface upwardly of said latter contact region.

5. The improvements of claim 4 wherein:
said sprinkler head and spindle define an annular recess entering the lower end of said head in coaxial surrounding relation with the upper end of said spindle, and
the upper end of said bearing sleeve enters said recess.

6. In a sprinkler assembly including a bearing sleeve having normally upper and lower ends, a tubular spindle containing a longitudinal water passage rotatable in said bearing sleeve and forming with said sleeve an intervening annular clearance space, lower coacting sealing and thrust bearing means on the lower ends of said bearing sleeve and spindle for sealing the lower end of said clearance space and limiting upward endwise displacement of said spindle relative to said bearing sleeve, a sprinkler head on the upper end of said spindle having a water discharge orifice communicating with said spindle passage, and means for driving said sprinkler head and spindle in rotation relative to said bearing sleeve, improved upper sealing means for sealing the upper end of said clearance space, comprising:
a coaxial cylindrical sealing surface on the upper end of said bearing sleeve,
a coaxial, downwardly facing annular sealing face on the lower end of said sprinkler head,
a seal ring surrounding said sealing surface including an annular body having an upper annular sealing face facing said sprinkler head sealing face and an annular flexible sealing and wiping lip about the inner perimeter of and depending downwardly from said body in surrounding yieldable wiping and sealing contact with said sealing surface,
said seal ring having a central opening through said ring body and lip receiving said sleeve and bounded by an inner annular surface of the ring, and
said inner ring surface being tapered such that said lip engages said sealing surface only along an annular region of contact at the lower end of the lip and said inner ring surface diverges from said sealing surface upwardly of said latter contact region.

7. The improvements of claim 6 wherein:
said sprinkler head and spindle define an annular recess entering the lower end of said head in coaxial surrounding relation with the upper end of said spindle, and
the upper end of said bearing sleeve enters said recess.

8. In a sprinkler assembly including a bearing sleeve having normally upper and lower ends, a tubular spindle containing a longitudinal water passage rotatable in said bearing sleeve and forming with said sleeve an intervening annular clearance space, a sprinkler head on the upper end of said spindle having a laterally opening water discharge orifice communicating with said spindle passage, and means for driving said sprinkler head and spindle in rotation relative to said bearing sleeve, improved lower coacting sealing and thrust bearing means on the lower ends of said bearing sleeve and spindle for sealing the lower end of said clearance space and limiting upward endwise displacement of said spindle relative to said bearing sleeve, comprising:
confronting axially facing coaxial sealing-thrust faces on the lower ends of said bearing sleeve and spindle, and seal and friction ring means surrounding said spindle between said latter faces including a carbon graphite ring, a wear resistant bearing ring in contact with one side of said graphite ring, and at least one resiliently compliant seal ring at one side of said graphite ring.

9. The improvements of claim 8 wherein:
said seal and friction ring means comprise resiliently compliant seal rings at opposite sides of said carbon graphite ring.

10. The improvements of claim 9 wherein:
one of said resiliently compliant seal rings is disposed in direct contact with said carbon-graphite ring.

11. The improvements of claim 10 wherein:
the lower end of said bearing sleeve is counterbored to define an annular recess entering the lower end of said bearing sleeve in coaxial surrounding relation with the lower end of said spindle, and
said wear resistant bearing ring comprises a relatively rigid ferrule above said carbon-graphite ring including a sleeve extending upwardly into said bearing sleeve recess and an outwardly directed flange about the lower end of said latter sleeve abutting the upper face of said carbon-graphite ring, and the other resiliently compliant seal ring is located between and in contact with said ferrule flange and said lower bearing sleeve sealing-thrust face.

12. The improvements of claim 11 wherein:
the upper end of said ferrule sleeve fits slidably in said lower bearing sleeve recess.

13. The improvements of claim 11 wherein:
said other resiliently compliant seal ring includes an annular sleeve portion extending upwardly into said lower bearing sleeve recess between and in contact with said ferrule sleeve and the wall of said recess.

14. A sprinkler assembly according to claim 1 wherein:
said means for effecting sprinkler head rotation comprises a spring biased impulse oscillator on said head activated by the water stream emerging through said orifice for driving said head and spindle in rotation relative to said bearing sleeve.

15. The improvements of claim 1 wherein:
said lower sealing and thrust bearing means comprises confronting axially facing coaxial annular sealing-thrust faces on the lower ends of said bearing sleeve and spindle, and seal and friction ring means surrounding said spindle between said latter faces including a carbon graphite ring, a wear resistant bearing ring in contact with one side of said graphite ring, and at least one resiliently compliant seal ring at one side of said graphite ring.

16. A sprinkler assembly according to claim 15 wherein:
said means for effecting sprinkler head rotation comprises a spring biased impulse oscillator on said head activated by the water stream emerging through said orifice for driving said head and spindle in rotation relative to said bearing sleeve.

17. A sprinkler assembly according to claim 2 wherein:
said means for effecting sprinkler head rotation comprises a spring biased impulse oscillator on said head activated by the water stream emerging through said orifice for driving said head and spindle in rotation relative to said bearing sleeve.

18. A sprinkler assembly according to claim wherein:

said means for effecting sprinkler head rotation comprises a spring biased impulse oscillator on said head activated by the water stream emerging through said orifice for driving said head and spindle in rotation relative to said bearing sleeve.

* * * * *